(12) United States Patent
Murata et al.

(10) Patent No.: US 7,491,774 B2
(45) Date of Patent: Feb. 17, 2009

(54) PRODUCING GRANULAR EPOXY RESIN BY REFINING AND PULVERIZING SOLID EPOXY RESIN

(75) Inventors: Yasuyuki Murata, Yokkaichi (JP); Atsuhito Hayakawa, Yokkaichi (JP); Akihiro Itou, Yokkaichi (JP)

(73) Assignee: Japan Epoxy Resins Co., Ltd., Tokyo (JP)

( * ) Notice: Subject to any disclaimer, the term of this patent is extended or adjusted under 35 U.S.C. 154(b) by 191 days.

(21) Appl. No.: 11/704,938

(22) Filed: Feb. 12, 2007

(65) Prior Publication Data

US 2007/0135616 A1    Jun. 14, 2007

Related U.S. Application Data

(62) Division of application No. 10/792,859, filed on Mar. 5, 2004, now Pat. No. 7,285,602.

(30) Foreign Application Priority Data

Apr. 8, 2003    (JP) .............................. 2003-104493

(51) Int. Cl.
 *B32B 3/04* (2006.01)
 *B32B 3/10* (2006.01)
 *C08L 63/02* (2006.01)
 *C08L 63/04* (2006.01)

(52) U.S. Cl. .................. 525/481; 428/130; 428/137; 428/138; 525/480; 525/523; 525/524; 525/525

(58) Field of Classification Search ................. None
See application file for complete search history.

(56) References Cited

U.S. PATENT DOCUMENTS

| | | | |
|---|---|---|---|
| 3,554,770 A | 1/1971 | Lipsky et al. | |
| 5,008,137 A | 4/1991 | Nugent, Jr. et al. | |
| 5,149,730 A * | 9/1992 | Murata et al. | 523/466 |
| 5,739,186 A * | 4/1998 | Hayakawa et al. | 523/443 |
| 6,046,284 A * | 4/2000 | Shinohara et al. | 525/523 |
| 6,255,365 B1 * | 7/2001 | Hayakawa et al. | 528/89 |
| 6,548,620 B2 * | 4/2003 | Murata | 528/89 |
| 2004/0202864 A1 | 10/2004 | Murata et al. | |

FOREIGN PATENT DOCUMENTS

| | | |
|---|---|---|
| JP | S57-031924 | 2/1982 |
| JP | S59-230069 | 12/1984 |
| JP | H08-104757 | 4/1996 |
| JP | 8 283688 | 10/1996 |
| JP | H09-328558 | 12/1997 |
| JP | 11 323099 | 11/1999 |
| JP | 2002-178438 | 6/2002 |
| JP | 2003-080631 | 3/2003 |
| TW | 555776 B | 10/2003 |
| TW | 200640975 | 12/2006 |

* cited by examiner

*Primary Examiner*—Robert Sellers
(74) *Attorney, Agent, or Firm*—Manabu Kanesaka

(57) ABSTRACT

A production method of granular epoxy resin includes an epoxy resin preparing step of preparing an epoxy resin which is solid at ordinary temperature by reaction between a phenol compound and epihalohydrin; a purifying processing step of refining the prepared epoxy resin which is solid at ordinary temperature so that the total content of compounds having a molecular weight of 200 or less is 0.28% by mass or less of the entire epoxy resin; and a pulverizing step of pulverizing the refined epoxy resin obtained by the purifying processing step under conditions so as not to make the total content of compounds having a molecular weight of 200 or less exceeding 0.3% by mass, wherein the epoxy resin which is solid at ordinary temperature prepared by the epoxy resin preparing step is mainly composed of at least one selected from oligomers represented by the following general formula (1) and oligomers represented by the following general formula (2).

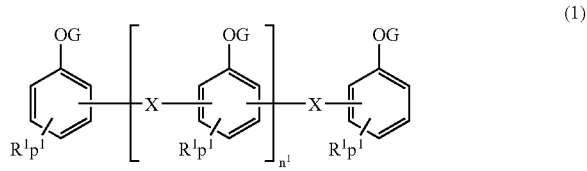

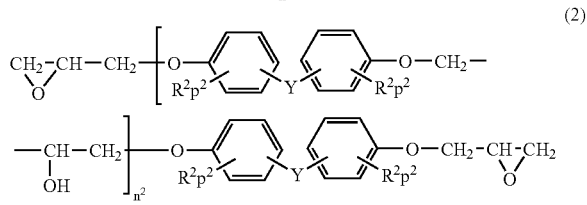

2 Claims, No Drawings

PRODUCING GRANULAR EPOXY RESIN BY REFINING AND PULVERIZING SOLID EPOXY RESIN

CROSS-REFERENCE TO RELATED APPLICATION

This is a divisional application of Ser. No. 10/792,859 filed on Mar. 5, 2004 now U.S. Pat. No. 7,285,602.

FIELD OF THE INVENTION

The present invention relates to a production method of granular epoxy resin which can exhibit excellent fluidity during molding because of its low melt viscosity and allows easy handling because it hardly causes blocking during storage and transportation and also relates to a package thereof.

BACKGROUND OF THE INVENTION

Epoxy resins have been used in various industrial fields such as adhesives, casting, encapsulation, lamination, molding, coatings, and insulation because of their excellent physical properties when cured and the ease of handling. Epoxy resins are generally categorized into a liquid type of which epoxy resins are liquid at ordinary temperature and a solid type of which epoxy resins are solid at ordinary temperature. Normally, such solid type epoxy resin is accommodated in an envelope type container in a powder or flaky form during the storage and the transportation. The solid type epoxy resin easily causes a phenomenon called "blocking" during the storage and the transportation due to its low molecular weight. The blocking is a phenomenon that particles of epoxy resin fuse and unite. The blocking leads to a serious handling problem that it becomes difficult to take out the resin from the container and to put the resin in another container for use.

In current years, in the use application of solid epoxy resins such as powder coatings or encapsulants for semiconductors, the trend is toward use of solid epoxy resins having further lower molecular weight for the purpose of improving the fluidity during molding. Accordingly, the above-mentioned blocking problem becomes increasingly serious.

Conventionally, the epoxy resin is therefore stored and transported at cool temperature in order to prevent the blocking, but there has been a problem of making the cost higher ("New Epoxy Resin" p 35-p36 written by Hiroshi Kakiuchi and issued by Shokodo Co., Ltd. May 30, 1988).

It is an object of the present invention to provide a granular epoxy resin which can exhibit excellent fluidity during molding because of its low melt viscosity and allows easy handling because it hardly causes blocking during storage and transportation, production method thereof, and a package thereof.

SUMMARY OF THE INVENTION

A granular epoxy resin according to the present invention is a granular matter of an epoxy resin which is solid at ordinary temperature and is mainly composed of one or more selected from oligomers represented by the following general formula (1) and oligomers represented by the following general formula (2).

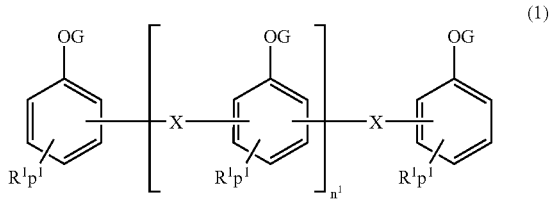

[In the above formula (1), G is a glycidyl group.
$R^1$ is a hydrocarbon group having from 1 to 10 carbon atoms and each $R^1$ can be the same or different.
X is a divalent hydrocarbon group having from 1 to 18 carbon atoms, —O—, —S—, or a group represented by the following general formula (3) and each X can be the same or different.

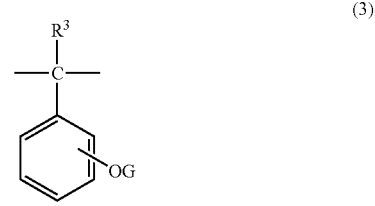

(in the above formula (3), G is a glycidyl group, $R^3$ is a hydrogen atom or a hydrocarbon group having from 1 to 5 carbon atoms.)
$p^1$ is an integer between 0 and 4 and each $p^1$ can be the same or different.
$n^1$ is an integer between 0 and 10.]

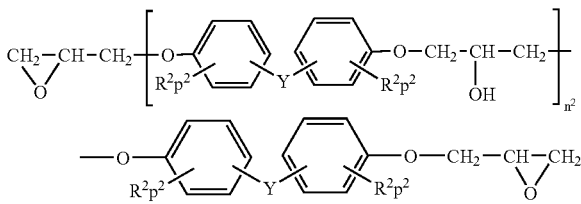

[In the above formula (2), $R^2$ is a hydrocarbon group having from 1 to 10 carbon atoms and each $R^2$ can be the same or different.
Y is a divalent hydrocarbon group having from 1 to 18 carbon atoms, —O—, —S—, —CO—, —SO$_2$—, or a direct bond and each Y can be the same or different.
$p^2$ is an integer between 0 and 4 and each $p^2$ can be the same or different.
$n^1$ is an integer between 0 and 10.]

In a first aspect of the invention, at least 50% by mass of the granular epoxy resin consists of at least one oligomer of $n^1=0$ in the aforementioned general formula (1) and having a molecular weight of 500 or less and/or at least one oligomer of $n^2=0$ in the aforementioned general formula (2) and having a molecular weight of 500 or less. The total content of compounds having a molecular weight of 200 or less is 0.3% by mass or less of the entire epoxy resin.

In a second aspect of the invention, at least 20% by mass of the granular epoxy resin consists of at least one oligomer $n^1=0$ in the aforementioned general formula (1) and having a molecular weight 400 or less and/or at least one oligomer of $n^2=0$ in the aforementioned general formula (2) and having a molecular weight of 400 or less. The total content of compounds having a molecular weight of 200 or less is 0.3% by mass or less of the entire epoxy resin.

Since the content of low molecular weight fragments is a predetermined amount or more, the granular epoxy resin of the present invention exhibits excellent fluidity during molding because of its low melt viscosity. On the other hand, since the content of particular low molecular weight compounds which easily cause blocking is a predetermined amount or less, the granular epoxy resin allows easy handling because it hardly causes blocking during storage and transportation.

Generally, an epoxy resin is a mixture which is mainly composed of oligomer(s) having a chemical structure represented by the aforementioned general formula (1) or the aforementioned general formula (2). The number of repeats or polymerization degree ($n^1$, $n^2$) in the general formula (1) and the general formula (2) is 0 or a positive integer. Typical epoxy resin is a mixture of a lot of components having different numbers of polymerization degree. The form, liquid or solid, of epoxy resin depends on the proportion of the components.

In a solid epoxy resin, the larger the amount of the components of which number of polymerization degree is 0 (components of $n^1=0$ and $n^2=0$) and/or the lower the molecular weight of the components, the lower the melt viscosity of the epoxy resin is so that the epoxy resin can exhibit excellent fluidity during molding, but easily causes the blocking. Particularly, a solid epoxy resin in which components having a molecular weight of 500 or less among components of which number of polymerization degree is 0 occupy 50% by mass or more, or components having a molecular weight of 400 or less among components of which number of repeats or cycles is 0 occupy 20% by mass or more easily causes the blocking.

On the other hand, typical epoxy resin contains a small amount of water and a small amount of residuals of organic compounds which was used for the preparation of the epoxy resin. The compounds having a molecular weight of 200 or less accelerate the occurrence of blocking even with a small amount because the molecular weights thereof are too low.

The granular epoxy resin of the present invention is designed to hardly cause blocking by setting the content of compound having a molecular weight of 200 or less to a predetermined amount or less in solid epoxy resin containing a large amount of components of which number of polymerization degree is 0 as mentioned above.

A production method of granular epoxy resin of the present invention comprises: an epoxy resin preparing step of preparing an epoxy resin which is solid at ordinary temperature by reaction between a phenol compound and epihalohydrin; a purifying processing step of refining the prepared epoxy resin which is solid at ordinary temperature so that the total content of compounds having a molecular eight of 200 or less is 0.28% by mass or less of the entire epoxy resin; and a pulverizing step of pulverizing the refined epoxy resin obtained by the purifying processing step under conditions so as not to make the total content of compounds having a molecular weight of 200 or less exceeding 0.3% by mass.

In one aspect of the production method, the epoxy resin which is solid at ordinary temperature prepared by the epoxy resin preparing step is mainly composed of at least one selected from oligomers represented by the aforementioned general formula (1) and oligomers represented by the aforementioned general formula (2). At least 50% by mass of the entire epoxy resin consists of at least one oligomer of $n^1=0$ in the aforementioned general formula (1) and having a molecular weight of 500 or less and at least one oligomer of $n^2=0$ in the aforementioned general formula (2) and having a molecular weight of 500 or less.

In the other aspect of the production method, the epoxy resin which is solid at ordinary temperature prepared by the epoxy resin preparing step is mainly composed of at least one selected from oligomers represented by the aforementioned general formula (1) and oligomers represented by the aforementioned general formula (2). At least 20% by mass of the entire epoxy resin consists of at least one oligomer of $n^1=0$ in the aforementioned general formula (1) and having a molecular weight 400 or less and at least one oligomer of $n^2=0$ in the aforementioned general formula (2) and having a molecular weight of 400 or less.

Both aspects of the production method of granular epoxy resin provides a granular epoxy resin which exhibits excellent fluidity during molding because of its low melt viscosity and yet allows easy handling because it hardly causes blocking during storage and transportation.

A package of a granular epoxy resin of the present invention has an envelope-like container containing therein the granular epoxy resin of the present invention. The envelope-like container is made of a synthetic resin film having a water vapor permeability rate of 50 g/m²·day or less at 40° C. with 90% relative humidity.

The package of a granular epoxy resin prevents the moisture absorption of the granular epoxy resin during storage and transportation, thereby preventing the blocking.

DESCRIPTION OF THE PREFERRED EMBODIMENTS

The granular epoxy resin according to the present invention is solid at ordinary temperature and is mainly composed of at least one selected from oligomers represented by the aforementioned general formula (1) and oligomers represented by the aforementioned general formula (2). In one embodiment, the epoxy resin includes components having a molecular weight of 500 or less among components of which number of repeats or cycles is 0 occupy 50% by mass or more of the entire epoxy resin. In another embodiment, the epoxy resin includes components having a molecular weight of 400 or less among components of which number of repeats or cycles is 0 occupy 20% by mass or more of the entire epoxy resin.

Among solid-type epoxy resins to be used as granular epoxy resin of the present invention, examples of resin which is mainly composed of oligomer(s) represented by the aforementioned formula (1) include epoxy resins which are derived from polyhydric phenol compounds such as phenol novolak resin, cresol novolak resin, bisphenol-A novolac resin, phenol aralkyl resin, biphenyl phenol resin, terpene phenol resin, and dicyclopentadiene phenol resin, with epihalohydrin. Examples of the polyhydric phenol compounds include polyhydric phenol resins obtained by condensation reaction of phenol and aldehyde such as benzaldehyde or hydroxy benzaldehyde.

Examples of solid epoxy resin which is mainly composed of oligomer(s) represented by the aforementioned formula (2) include epoxy resins which are derived from bisphenols with epihalohydrin. Examples of bisphenols include bisphenol A, bisphenol F, tetramethyl bisphenol F, bisphenol AD, bisphenol AP, biphenol, tetramethyl biphenol, dihydroxy diphenyl ether, thiodiphenols, and dihydroxy stilbenes.

The solid epoxy resin according to the present invention may be composed of a single one of these epoxy resins or two or more of these epoxy resins.

Each of the epoxy resins is solid in amorphous or crystalline state at ordinary temperature. Concretely, from the viewpoint of handling, the epoxy resins are required to have a softening point of 45° C. or more, preferably 50° C. or more in case of amorphous state and to have a melting point of 30° C. or more, preferably 35° C. or more in case of crystalline state. The ordinary temperature used herein means a temperature in a range 5° C. above and below 25° C.

Among the aforementioned resins, the solid epoxy resin to be used for the granular epoxy resin of the present invention is a resin in which components having a molecular weight of 500 or less among components of $n^1=0$ in the aforementioned general formula (1) and components of $n^2=0$ in the aforementioned general formula (2) occupy 50% by mass or more of the entire epoxy resin, or, components having a molecular weight of 400 or less among the components of $n^1=0$ and the components $n^2=0$ occupy 20% by mass or more of the entire epoxy resin.

The resin itself hardly causes blocking, when the molecular weights of the components of $n^1=0$ and the components of $n^2=0$ are large, the content of components having a molecular weight of 500 or less among the components of $n^1=0$ and components having a molecular weight of 500 or less among the components of $n^2=0$ is a predetermined amount or less, or the content of components having a molecular weight of 400 or less among the components of $n^1=0$ and components having a molecular weight of 400 or less among the components of $n^2=0$ is a predetermined amount or less. In this case, therefore, the reduction in content of compounds having a molecular weight of 200 or less according to the present invention cannot be effective.

According to the granular epoxy resin of the present invention, in an epoxy resin which easily causes blocking because the content of components having low molecular weight among components of which number of polymerization degree is 0 exceeds a predetermined amount, the content of compounds having a molecular weight of 200 or less (hereinafter, referred to as "low molecular weight compound") is 0.3% by mass or less.

Examples of the low molecular weight compounds in the epoxy resin include water, residuals of organic compounds used during a process of producing epoxy resin, for example, methyl isobutyl ketone, toluene and xylene used as a reaction solvent. The smaller the content of these low molecular weight compounds in the epoxy resin is, the higher the effect of preventing the blocking exhibits. Particularly, the content of the low molecular weight compounds is preferably 0.25% by mass or less, more preferably 0.20% by mass or less. However, excessively reducing the content of the low molecular weight compounds makes the purifying process described later complex, thus leading increase in cost. When the lower limit of the content of the low molecular weight compounds is about 0.05% by mass, the enough effect of preventing the blocking can be obtained.

The form of the granular epoxy resin of the present invention is not limited to spherical and may be a block form, a virgulate form, a plate form, or another form. The finer the particles of the epoxy resin are, the easier the blocking is caused. In this case, therefore, the reduction in content of compounds having a molecular weight of 200 or less according to the present invention can be very effective. That is, in case of a powder or granular epoxy resin which contains particles having a maximum particle diameter of 30 mm or less, particularly 20 mm or less, in an amount of 80% by mass or more, the effect of preventing the blocking of the present invention can exhibit well. The maximum particle diameter used herein means the length of the longest portion of particle of the epoxy resin.

The method of producing the granular epoxy resin of the present invention is not particularly specified. However, the production method of granular epoxy resin according to the present invention is preferable because the granular epoxy resin can be produced easily and inexpensively.

In the production method of the granular epoxy resin according to the present invention, as the first step, the polyhydric phenol resin and/or the bisphenol react with epihalohydrin in the presence of alkali metal hydroxide so that they are converted into glycidyl ethers. This reaction may be conducted in a known manner.

Used as the epihalohydrin for this reaction is generally epichlorohydrin or epibromohydrin. Used as the alkali metal hydroxide is generally NaOH or KOH.

The molecular weights and the content of the components of $n^1=0$ in the aforementioned general formula (1) and the components of $n^2=0$ in the aforementioned general formula (2) are adjusted according to the kind(s) of the selected phenol(s) as their material and the reaction condition with the epihalohydrin.

There are many treatment methods after reaction, but normally, salts produced as a by-product and excessive alkali metal hydroxide are removed from the produced epoxy resin solution by washing with water.

As the used solvent for the reaction, excessive epihlorohydrin may be directly used or an organic solvent which is not active relative to the other reaction may be used. Examples of the organic solvent include methyl ethyl ketone, methyl isobutyl ketone, toluene, and xylene.

As the next step of the production method of granular epoxy resin according to the present invention, the thus obtained epoxy resin solution is treated by removing low molecular weight compounds such as the solvent, the reaction water, or the water entering during the washing, thus obtaining an epoxy resin in which the content of low molecular weight compounds is small.

The method of removing low molecular weight compounds is not specified. However, the method by distillation is preferable because the removal of low molecular weight compounds can be achieved easily and inexpensively. Examples of the removing method by distillation include a batch distillation using a distillation still and a continuous distillation using a rotary evaporator.

This purifying process is conducted to satisfy a condition that the total content of low molecular weight compounds having a molecular weight of 200 or less in the epoxy resin becomes 0.28% by mass or less, preferably 0.25% by mass or less, more preferably 0.20% by mass or less.

The actual distillation condition depends on the aspect of the epoxy resin and the boiling point of the low molecular weight compounds to be removed. In case of the batch distillation, usually, the temperature is from 50° C. to 230° C., the residence time is from 30 minutes to 5 hours, and the pressure is from 0.5 Torr to 100 Torr. In case of the continuous distillation, usually, the temperature is from 50° C. to 230° C., the residence time is from 0.5 minutes to 10 minutes, and the pressure is from 0.5 Torr to atmospheric pressure.

Since the epoxy resin just after removing the low molecular weight compounds is normally in a molten state, the epoxy resin is cooled and thus converted into solid in amorphous or crystalline state and is then granulated. The granulation may be conducted simultaneously with the solidification by using a drop former or conducted by solidifying and aggregating the epoxy resin and then pulverizing the aggregated epoxy resin by using a mill such as a hummer mill, a ball mill, a feather mill, a pulverizer, or a jet mill. The granulated solid epoxy resin is accommodated in an envelope-like container for storage or transportation.

In the processes of solidification, granulation, packaging, and storage after the purifying process, various conditions must be satisfied in such a manner that the content of low molecular weight compounds having a molecular weight of 200 or less in the granular epoxy resin never exceed 0.3% by mass. For example, it must be careful not to allow the entry of low molecular weight compounds having a molecular weight of 200 or less from various equipments and the atmosphere. In particular, since the epoxy resin is generally hygroscopic, it is required not to absorb moisture in the atmosphere. As an example of the method for this, the humidity and the like in the atmosphere are adjusted by an air conditioner and the solidification and the like are conducted in a sealed system.

Since the epoxy resin tends to absorb moisture also during storage or transportation, the container used for packing the granular epoxy resin of the present invention is preferably made of a material having low moisture permeability. The material having low moisture permeability may be a synthetic resin film which is made of polyolefin, polyamide, polyester, polystyrene, or polyvinylchloride and has a water vapor permeability rate of 50 $g/m^2 \cdot day$ or less at 40° C. with 90% relative humidity, more preferably a composite film which has an aluminum layer and/or a silicon oxide layer on a surface of such a synthetic resin film or between layers of such a synthetic resin film and has a water vapor permeability rate of 5 $g/m^2 \cdot day$ or less at 40° C. with 90% relative humidity. The above-mentioned synthetic resin film may be a laminated film comprising films made of two or more different materials. In the above-mentioned composite film, the aluminum layer or the silicon oxide layer may be prepared as a membrane and laminated on the synthetic resin film or may be directly formed on the synthetic resin film by vapor deposition.

The preferable packaging form of the granular epoxy resin of the present invention is a granular epoxy resin package obtained by accommodating the granular epoxy resin of the present invention into an envelope-like container which is made by forming the synthetic resin film having a water vapor permeability rate of 50 $g/m^2 \cdot day$ at 40° C. with 90% relative humidity or the composite film having a water vapor permeability rate of 5 $g/m^2 \cdot day$ at 40° C. with 90% relative humidity into an envelope-like configuration. The method of forming the envelope-like container is not particularly specified. However, it is required to seal joint portion(s) by heat seal or the like so as not to spoil the moisture proofness. It is preferable to also seal the mouth by heat seal or the like after filled with the granular epoxy resin. The content of the granular epoxy resin package is in a range of 0.5-50 kg, preferably 1.0-30 kg in terms of handling property and the like. Though the container may be made of the synthetic resin film only, a paper layer may be provided as an exterior or the granular epoxy resin package may be put into a paper envelope in order to prevent the photo-aging of the granular epoxy resin and prevent the slippage when stacked.

Since the granular epoxy resin of the present invention can exhibit excellent fluidity during molding because of its low melt viscosity and allows easy handling because it hardly causes blocking during storage and transportation, the granular epoxy resin can be used for various use applications. According to the production method of granular epoxy resin of the present invention, the granular epoxy resin of the present invention having the aforementioned advantages can be easily produced. The granular epoxy resin package of the present invention can prevent the blocking of the granular epoxy resin of the present invention due to moisture during the storage or transportation.

Hereinafter, examples of the granular epoxy resins of the present invention and comparative examples will be given.

In every example, the content of components of $n^1=0$ or $n^2=0$ in resin was measured according to the GPC analysis using an RI detector. Organic compounds having moisture weight of 200 or less were measured by gas chromatography analysis. The water content was measured by Karl Fisher tiltration method.

EXAMPLE 1

775 g of a polycondensation of phenol and benzaldehyde [a phenol compound which was represented by the aforementioned general formula (1) where G was a hydrogen atom, X was a benzylidene group, $p^1$ was 0, and $n^1$ was an integer between 0 and 5 and in which the content of components of which $n^1$ was 0 was 43% by mass] and 2775 g of epichlorohydrin were fed into a three-neck flask of which capacity was 5 liter and which was provided with a temperature indicator, an agitator, and a cooling pipe, and were heated to a temperature of 90° C. so that they were molten. After that, 412.5 g of sodium hydroxide aqueous solution of 48.5% by mass was delivered by drops into the solution, taking one hour. During this, the temperature of the reaction liquid was maintained at 95° C. or higher so as to cause azeotoropy of the reaction liquid. Condensate liquid was obtained by cooling vapor evaporating from the reaction liquid. The obtained condensate liquid was subjected to the oil layer/water layer separation. The oil layer was returned back to the reaction system after removing the water layer. In this manner, the reaction system was dehydrated. The dehydration was continued for 30 minutes even after the dropping of the sodium hydroxide solution. Then, excessive epichlorohydrin was distilled from the thus obtained product under reduced pressure, thereby obtaining a crude epoxy resin.

The crude epoxy resin was solved in 1250 g of methyl isobutyl ketone (MIBK). 10 g of sodium hydroxide aqueous solution of 48.5% by mass was added into the solution and was maintained at a temperature of 70° C. to react for one hour. After the reaction, sodium dihydrogen phosphate was added to neutralize the excessive sodium hydroxide. Salts produced as a by-product were removed by washing with water. Then, the methyl isobutyl ketone and water were distilled by heating under reduced pressure. Finally, the thus obtained product was subjected to distillation treatment at a pressure of 10 Torr and at a temperature of 150° C. for 30 minutes, thereby obtaining an epoxy resin in the molten state.

The epoxy resin can be represented by the general formula (1) where X was a benzylidene group, $p^1$ was 0, and $n^1$ was an integer between 0 and 5 and in which the content of components of $n^1=0$ (having a molecular weight of 388) was 36% by mass and, at this point, the content of methyl isobutyl ketone was 0.05% by mass and water content was 0.01% by mass or less. No compound of which molecular weight was 200 or less was detected besides the methyl isobutyl ketone and water (the content of low molecular weight compounds in the epoxy resin was 0.06% by mass).

The epoxy resin in the molten state was placed in a sealed container and was then gradually cooled to solidify the epoxy resin. After that, the solidified resin was pulverized by a hammer mill in the atmosphere at a temperature of 20° C. and a relative humidity of 50% in such a manner as to obtain a granular epoxy resin in which particles having a maximum particle diameter of 2 mm or less occupy 90% by mass.

The epoxy resin was an umber solid having an epoxy equivalent of 225 g/eq., a softening point of 63° C., and a melt viscosity of 0.11 Pa·s at 150° C. and in which, at this point, the content of methyl isobutyl ketone was 0.05% by mass and water content was 0.05% by mass (the content of low molecular weight compounds in the granular epoxy resin was 0.1% by mass).

A composite film [water vapor permeability rate (40° C. with 90% relative humidity): 0.5 g/m$^2$·day] was prepared by laminating a nylon film (15 microns) and an LLDPE film (70 microns) which was treated with antistatic finish onto a gas barrier film available from Mitsubishi Plastics, Inc. trademark: TECHBARRIER V [silica-vacuum-coated polyethylene terephthalate film (12 microns)]. An envelope which was 20 cm in width×30 cm in height was made of the composite film by heat-sealing three sides other than the top. The envelope was filled with 1 kg of granular epoxy resin produced as mentioned above and was sealed by heat sealing. The envelope was inserted into a paper bag having three layers of Kraft paper, thus completing a granular epoxy resin package.

The granular epoxy resin package was stored under ambient conditions at a temperature of 25° C. and a relative humidity of 85% and the resin inside the package was checked for the change with time in low molecular weight compound content (water and MIBK) and the blocking state of the resin was observed. The results are shown in Table 1.

COMPARATIVE EXAMPLE 1

After the reaction between the phenol compound and the epichlorohydrin, washing with water, and the like in the same manner as Example 1, methyl isobutyl ketone and water were distilled by heating under reduced pressure. Finally, the thus obtained product was subjected to distillation treatment at a pressure of 50 Torr and at a temperature of 150° C. for 30 minutes, thereby obtaining an epoxy resin. At this point, the content of methyl isobutyl ketone was 0.5% by mass and water content was 0.02% by mass (the content of low molecular weight compounds in the epoxy resin was 0.52% by mass).

After that, he epoxy resin was solidified, pulverized, and packaged in the same manner as Example 1, thereby producing a granular epoxy resin package. At a point just after the packaging, the content of methyl isobutyl ketone in the granular epoxy resin was 0.52% by mass and water content in the granular epoxy resin was 0.07% by mass (the content of low molecular weight compounds in the granular epoxy resin was 0.59% by mass).

The granular epoxy resin package was stored under ambient conditions at a temperature of 25° C. and a relative humidity of 85% and the resin inside the package was checked for the change with time in low molecular weight compound content (water and MIBK) and the blocking state of the resin was observed. The results are shown in Table 1.

COMPARATIVE EXAMPLE 2

A granular epoxy resin was produced in the same manner as Example 1 except that the solidification was conducted in an open container under ambient conditions at a temperature of 25° C. and a relative humidity of 85% and the pulverization was conducted also in the same ambient conditions. Also, a granular epoxy resin package was made in the same manner as Example 1. At a point just after the packaging, the content of methyl isobutyl ketone in the granular epoxy resin was 0.05% by mass and water content in the granular epoxy resin was 0.32% by mass (the content of low molecular weight compounds in the granular epoxy resin was 0.37% by mass).

The granular epoxy resin package was stored under ambient conditions at a temperature of 25° C. and a relative humidity of 85% and the resin inside the package was checked or the change with time in low molecular weight compound content (water and MIBK) and the blocking state of the resin was observed. The results are shown in Table 1.

REFERENCE EXAMPLE 1

A paper bag having three layers of Kraft paper (water vapor permeability rate (40° C. with 90% relative humidity): 100 g/m$^2$·day or more) was filled with 1 kg of a granular epoxy resin manufactured in the same manner as Example 1 and was sealed with glue, thereby making a granular epoxy resin package.

The granular epoxy resin package was stored under ambient conditions at a temperature of 25° C. and a relative humidity of 85% and the resin inside the package was checked for the change with time in low molecular weight compound content (water and MIBK) and the blocking state of the resin was observed. The results are shown in Table 1.

COMPARATIVE EXAMPLE 3

A granular epoxy resin was produced in the same manner as Comparative Example 1 except using 800 g of a polycondensation product of phenol and benzoic aldehyde in which the content of components of $n^1=0$ was 21% by mass. Also, a granular epoxy resin package was made in the same manner as Comparative Example 1.

The epoxy resin was an umber solid in which the content of components (having a molecular weight of 388) of $n^1=0$ was 17% by mass and having an epoxy equivalent of 231 g/eq., a softening point of 76° C., and a melt viscosity of 0.57 Pa·s at 150° C. At a point just after the packaging, the content of methyl isobutyl ketone in the granular epoxy resin was 0.65% by mass and water content in the granular epoxy resin was 0.08% by mass (the content of low molecular weight compounds in the granular epoxy resin was 0.73% by mass).

The granular epoxy resin package was stored under ambient conditions at a temperature of 25° C. and a relative humidity of 85% and the resin inside the package was checked for the change with time in low molecular weight compound content (water and MIBK) and the blocking state of the resin was observed. The results are shown in Table 1.

EXAMPLE 2

A granular epoxy resin was produced in the same manner as Example 1 except using 605 g of 2,6-xylenol dimer instead of the polycondensation product of phenol and benzoic aldehyde. Also, a granular epoxy resin package was made in the same manner as Example 1.

The epoxy resin can be represented by the aforementioned general formula (2) where Y was a direct bond, $R^2$ was a methyl group, $p^2$ was 2, and $n^2$ was an integer between 0 and 3 and in which the content of components (having a molecular weight of 354) of $n^2=0$ was 86% by mass and was a faintly-yellow solid having an epoxy equivalent of 185 g/eq., a melting point of 106° C., and a melt viscosity of 0.02 Pa·s at 150° C. At a point just after the packaging, the content of methyl isobutyl ketone in the granular epoxy resin was 0.04% by mass and water content in the granular epoxy resin was 0.03% by mass (the content of low molecular weight compounds in the granular epoxy resin was 0.07% by mass).

The granular epoxy resin package was stored under ambient conditions at a temperature of 25° C. and a relative humidity of 85% and the resin inside the package was checked for the change with time in low molecular weight compound content (water and MIBK) and the blocking state of the resin was observed. The results are shown in Table 1.

EXAMPLE 3

A granular epoxy resin was produced in the same manner as Example 1 except using 392 g of a polycondensation product of phenol and hydroxy benzoic aldehyde [a phenol compound which was represented by the aforementioned general formula (1) where G was a hydrogen atom, X was a group represented by the general formula (3), $p^1$ was 0, $R^3$ was a hydrogen atom, and $n^1$ was an integer between 0 and 4 and in which the content of components of which $n^1$ was 0 was 52% by mass] and 93 g of 4,4'-bisphenol instead of the polycondensation product of phenol and benzoic aldehyde. Also, a granular epoxy resin package was made in the same manner as Example 1.

The epoxy resin was a mixture of about 80% by mass of an epoxy resin which was represented by the aforementioned general formula (1) where X was a group represented by the general formula (3), $p^1$ was 0, $R^3$ was a hydrogen atom, and $n^1$ as an integer between 0 and 4 and about 20% by mass of an epoxy resin which was represented by the aforementioned general formula (2) where Y was a direct bond, $p^2$ was 0, and $n^2$ was an integer between 0 and 3 and in which the content of components (having a molecular weight of 460) of $n^1=0$ was 37% by mass and the content of components (having a molecular weight of 298) of $n^2=0$ was 18% by mass. The epoxy resin was a faintly-yellow solid having an epoxy equivalent of 163 g/eq. and a melt viscosity of 0.04 Pa·s at 150° C. At a point just after the packaging, the content of methyl isobutyl ketone in the granular epoxy resin was 0.04% by mass and water content in the granular epoxy resin was 0.04% by mass (the content of low molecular weight compounds in the granular epoxy resin was 0.08% by mass).

The granular epoxy resin package was stored under ambient conditions at a temperature of 25° C. and a relative humidity of 85% and the resin inside the package was checked for the change with time in low molecular weight compound content (water and MIBK) and the blocking state of the resin was observed. The results are shown in Table 1.

TABLE 1

|  | Example 1 | Example 2 | Example 3 | Comparative Example 1 | Comparative Example 2 | Reference Example 1 | Comparative Example 3 |
|---|---|---|---|---|---|---|---|
| N = 0 component |  |  |  |  |  |  |  |
| Molecular weight of 500 or less (% by mass) |  |  | 55 |  |  |  |  |
| Molecular weight of 400 or less (% by mass) | 36 | 86 | 18 | 36 | 36 | 36 | 17 |
| Melt viscosity at 150° C. (Pa · s) | 0.11 | 0.02 | 0.04 | 0.11 | 0.11 | 0.11 | 0.57 |
| Just after packaging |  |  |  |  |  |  |  |
| Water content (% by mass) | 0.05 | 0.03 | 0.04 | 0.07 | 0.32 | 0.05 | 0.08 |
| MIBK content (% by mass) | 0.05 | 0.04 | 0.04 | 0.52 | 0.05 | 0.05 | 0.65 |
| 10 days after |  |  |  |  |  |  |  |
| Water content (% by mass) | 0.05 | 0.03 | 0.04 | 0.07 | 0.32 | 0.21 | 0.08 |
| MIBK content (% by mass) | 0.05 | 0.04 | 0.04 | 0.52 | 0.05 | 0.05 | 0.64 |
| Blocking State | ○ | ○ | ○ | Δ | Δ | ○ | ○ |
| 20 days after |  |  |  |  |  |  |  |
| Water content (% by mass) | 0.06 | 0.03 | 0.05 | 0.08 | 0.33 | 0.30 | 0.08 |
| MIBK content (% by mass) | 0.05 | 0.04 | 0.04 | 0.52 | 0.05 | 0.05 | 0.63 |
| Blocking State | ○ | ○ | ○ | X | X | Δ | ○ |
| 30 days after |  |  |  |  |  |  |  |
| Water content (% by mass) | 0.07 | 0.04 | 0.07 | 0.08 | 0.35 | 0.48 | 0.09 |
| MIBK content (% by mass) | 0.05 | 0.04 | 0.04 | 0.51 | 0.05 | 0.04 | 0.63 |
| Blocking State | ○ | ○ | ○ | X | X | X | ○ |

Note for Table 1
Blocking state ○: Granular state equivalent to that just after packaging
Δ: Blocking partially occurs
X: Blocking entirely occurs As apparent from Table 1, the granular epoxy resin of the present invention can exhibit excellent fluidity during molding because of its low melt viscosity and yet allows easy handling because it hardly causes blocking during storage and transportation. As described in Examples, the production method of granular epoxy resin of the present invention allows easy production of the epoxy resin of the present invention.

The invention claimed is:

1. A production method of granular epoxy resin comprising:
   an epoxy resin preparing step of preparing an epoxy resin which is solid at ordinary temperature by reaction between a phenol compound and epihalohydrin;
   a purifying processing step of refining the prepared epoxy resin which is solid at ordinary temperature so that the total content of compounds having a molecular weight of 200 or less is 0.28% by mass or less of the entire epoxy resin; and
   a pulverizing step of pulverizing the refined epoxy resin obtained by the purifying processing step under conditions so as not to make the total content of compounds having a molecular weight of 200 or less exceeding 0.3% by mass,
   wherein the epoxy resin which is solid at ordinary temperature prepared by said epoxy resin preparing step is mainly composed of at least one selected from oligomers represented by the following general formula (1) and oligomers represented by the following general formula (2), and
   at least 50% by mass of the entire epoxy resin consists of at least one oligomer of $n^1=0$ in the following general formula (1) and having a molecular weight of 500 or less and/or at least one oligomer of $n^2=0$ in the following general formula (2) and having a molecular weight of 500 or less;

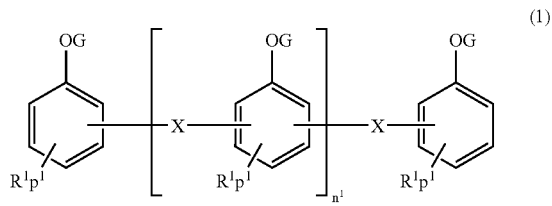

(1)

wherein in the above formula (1), G is a glycidyl group;
$R^1$ is a hydrocarbon group having from 1 to 10 carbon atoms and each $R^1$ can be the same or different;
X is a divalent hydrocarbon group having from 1 to 18 carbon atoms, —O—, —S—, or a group represented by the following general formula (3) and each X can be the same or different;

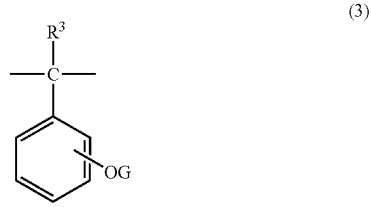

(3)

wherein the above formula (3), G is a glycidyl group, $R^3$ is a hydrogen atom or a hydrocarbon group having from 1 to 5 carbon atoms;
$p^1$ is an integer between 0 and 4 and each $p^1$ can be the same or different;
$n^1$ is an integer between 0 and 10;

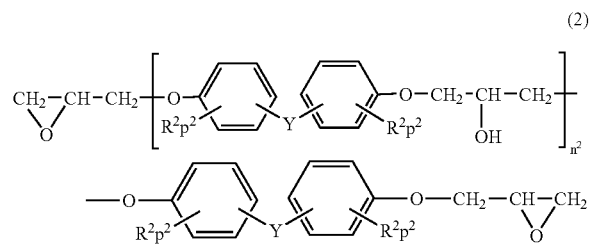

(2)

wherein the above formula (2), $R^2$ is a hydrocarbon group having from 1 to 10 carbon atoms and each $R^2$ can be the same or different;
Y is a divalent hydrocarbon group having from 1 to 18 carbon atoms, —O—, —S—, —CO—, —SO$_2$—, or a direct bond and each Y can be the same or different;
$p^2$ is an integer between 0 and 4 and each $p^2$ can be the same or different;
$n^2$ is an integer between 0 and 10.

2. A production method of granular epoxy resin comprising:
   an epoxy resin preparing step of preparing an epoxy resin which is solid at ordinary temperature by reaction between a phenol compound and epihalohydrin;
   a purifying processing step of refining the prepared epoxy resin which is solid at ordinary temperature so that the total content of compounds having a molecular weight of 200 or less is 0.28% by mass or less of the entire epoxy resin; and
   a pulverizing step of pulverizing the refined epoxy resin obtained by the purifying processing step under conditions so as not to make the total content of compounds having a molecular weight of 200 or less exceeding 0.3% by mass,
   wherein the epoxy resin which is solid at ordinary temperature prepared by said epoxy resin preparing step is mainly composed of at least one selected from oligomers represented by the following general formula (1) and oligomers represented by the following general formula (2), and
   at least 20% by mass of the entire epoxy resin consists of at least one oligomer of $n^1=0$ in the following general formula (1) and having a molecular weight 400 or less and/or at least one oligomer of $n^2=0$ in the following general formula (2) and having a molecular weight of 400 or less;

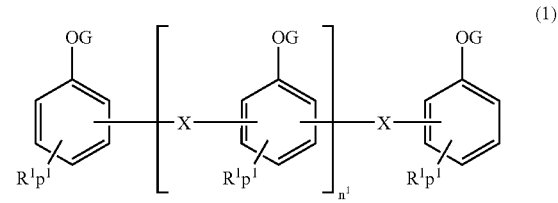

(1)

wherein the above formula (1), G is a glycidyl group;
$R^1$ is a hydrocarbon group having from 1 to 10 carbon atoms and each $R^1$ can be the same or different;
X is a divalent hydrocarbon group having from 1 to 18 carbon atoms, —O—, —S—, or a group represented by the following general formula (3) and each X can be the same or different;

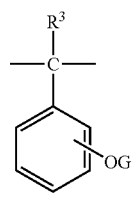
(3)

wherein the above formula (3), G is a glycidyl group, $R^3$ is a hydrogen atom or a hydrocarbon group having from 1 to 5 carbon atoms;

$p^1$ is an integer between 0 and 4 and each $p^1$ can be the same or different;

$n^1$ is an integer between 0 and 10;

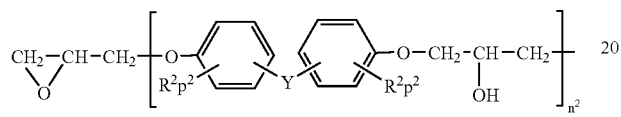
(2)

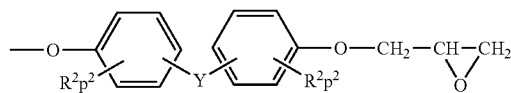

wherein the above formula (2), $R^2$ is a hydrocarbon group having from 1 to 10 carbon atoms and each $R^2$ can be the same or different;

Y is a divalent hydrocarbon group having from 1 to 18 carbon atoms, —O—, —S—, —CO—, —SO$_2$—, or a direct bond and each Y can be the same or different;

$p^2$ is an integer between 0 and 4 and each $p^2$ can be the same or different;

$n^2$ is an integer between 0 and 10.

* * * * *